United States Patent
Peng et al.

(10) Patent No.: US 10,020,751 B1
(45) Date of Patent: Jul. 10, 2018

(54) MULTI-OUTPUT CONTROL SYSTEM AND OPERATING METHOD FOR THE SAME

(71) Applicant: Chicony Power Technology Co., Ltd., New Taipei (TW)

(72) Inventors: Tso-Jen Peng, New Taipei (TW); Yi-Ching Su, New Taipei (TW)

(73) Assignee: Chicony Power Technology Co., Ltd., New Taipei (TW)

( * ) Notice: Subject to any disclaimer, the term of this patent is extended or adjusted under 35 U.S.C. 154(b) by 0 days.

(21) Appl. No.: 15/851,084

(22) Filed: Dec. 21, 2017

(30) Foreign Application Priority Data

Oct. 20, 2017 (TW) .............................. 106136254 A (51) Int. Cl.
| | | |
|---|---|---|
| *H02M 3/335* | (2006.01) | |
| *H02J 13/00* | (2006.01) | |
| *H02J 1/04* | (2006.01) | |
| *H02M 1/00* | (2006.01) | |
| *H02M 5/293* | (2006.01) | |

(52) U.S. Cl.
CPC ........... *H02M 3/33561* (2013.01); *H02J 1/04* (2013.01); *H02J 13/0096* (2013.01); *H02M 2001/0003* (2013.01); *H02M 2005/2932* (2013.01)

(58) Field of Classification Search
CPC .................. H02J 1/04; H02J 13/0096; H02M 2001/0003; H02M 2001/0045; H02M 2001/008; H02M 2005/2932
See application file for complete search history.

(56) References Cited

U.S. PATENT DOCUMENTS

| | | | | |
|---|---|---|---|---|
| 6,229,289 B1* | 5/2001 | Piovaccari | .......... | H02M 3/1588 |
| | | | | 323/268 |
| 6,661,211 B1* | 12/2003 | Currelly | ............... | H02M 1/36 |
| | | | | 323/268 |
| 9,642,587 B2* | 5/2017 | Jin | ............................ | A61B 6/54 |
| 9,673,622 B2* | 6/2017 | Wang | ..................... | H02J 1/00 |
| 9,906,073 B1* | 2/2018 | Chou | ...................... | H02J 9/061 |
| 9,912,306 B1* | 3/2018 | Lin | ........................... | H03F 3/20 |
| 2006/0087303 A1* | 4/2006 | Hartular | ............... | H02M 3/156 |
| | | | | 323/283 |
| 2014/0273897 A1* | 9/2014 | Drogi | ................... | H04B 1/0458 |
| | | | | 455/127.3 |
| 2014/0368035 A1* | 12/2014 | Lofthouse | ............. | H02M 3/155 |
| | | | | 307/31 |
| 2016/0118880 A1* | 4/2016 | Motoki | ................. | H02M 3/156 |
| | | | | 323/282 |
| 2017/0099047 A1* | 4/2017 | Hsiao | ..................... | H03K 17/30 |

* cited by examiner

*Primary Examiner* — Yusef A Ahmed (74) *Attorney, Agent, or Firm* — Muncy, Geissler, Olds & Lowe, P.C.

(57) ABSTRACT

A multi-output control system includes a power conversion module, a first active linear module, a second active linear module, a control module and a feedback control module. The control module controls the feedback control module to adjust an output power based on current signals. The first active linear module and the second active linear module determine whether a difference value between a current value of a first output power and a current value of a second output power is greater than a current difference predetermined value based on the current signals, and the control module adjusts a voltage value of the first output power and a voltage value of the second output power to respectively be within a predetermined voltage range based on the current signals.

19 Claims, 6 Drawing Sheets

MULTI-OUTPUT CONTROL SYSTEM AND OPERATING METHOD FOR THE SAME

BACKGROUND OF THE INVENTION

Field of the Invention

The present invention relates to a multi-output control system and an operating method for the same, and especially relates to a low-cost high-efficiency active multi-output control system and an operating method for the same.

Description of the Related Art

USB and Type-C are used widely so the charging voltage for the cellphone is mainly 5 volts, and the voltage compensation mechanism for the cable is added to the cellphone design to ensure that the output side voltage can be stable and is not influenced by the cable loss of the cable. In other words, the influence of the cable loss of the cable can be minimized by the voltage compensation mechanism.

In the application of the single output, the voltage compensation mechanism for the cable can be achieved by detecting the output current and controlling the output voltage feedback. However, this method does not work if there are multiple outputs. The reason is that all outputs are supplied power by the same power source, but the loadings of the loads of the outputs are different, so the cable losses of the outputs are different. For example, if the load of one output has full loading while the load of another output has no loading, at this time in order to consider the voltage drop of the cable corresponding to full loading, the voltage value of the power source has to increase. But once the voltage value of the power source increases, the output voltage corresponding to no loading will be out of the specifications. However, the output voltage corresponding to full loading will be too low if the voltage compensation mechanism is not performed. Moreover, if DC-DC converters are arranged at the output sides to avoid the output voltages being out of the specifications, the voltage value requirement of each output can be achieved. But the cost of the whole circuit, the complexity of the circuit controlling, and the conversion loss of the power converters will increase. In other words, the system efficiency is decreasing.

Therefore, how to design a multi-output control system and an operating method for the same that can still maintain the voltage values of the output powers to be within the output specifications when the loadings of the loads are different is a big subject for the inventors of the present invention to overcome and solve the problems mentioned above.

SUMMARY OF THE INVENTION

In order to solve the above-mentioned problems, the present invention provides a multi-output control system to overcome the prior art problems. Therefore, the multi-output control system of the present invention comprises a power conversion module, a first active linear module, at least one second active linear module, a control module and a feedback control module. The power conversion module is configured to output an output power. The first active linear module is coupled to the power conversion module and is configured to convert the output power into a first output power. The at least one second active linear module is coupled to the power conversion module and is configured to convert the output power into at least one second output power. The control module is coupled to the first active linear module and the at least one second active linear module, and is configured to receive a plurality of current signals outputted by the first active linear module and the at least one second active linear module. The feedback control module is coupled to the power conversion module and the control module, and is configured to receive the output power. The control module is configured to control the feedback control module to adjust the output power based on the current signals. The first active linear module and the at least one second active linear module are configured to determine whether a difference value between a current value of the first output power and a current value of the at least one second output power is greater than a current difference predetermined value based on the current signals, and the control module is configured to adjust a voltage value of the first output power and a voltage value of the at least one second output power to respectively be within a predetermined voltage range based on the current signals respectively.

In an embodiment, when the control module determines that the current value of the first output power or the current value of the at least one second output power increases based on the current signals, the control module is configured to control the feedback control module to increase a voltage value of the output power to maintain both the voltage value of the first output power and the voltage value of the at least one second output power to be within the predetermined voltage range.

In an embodiment, when the difference value between the current value of the first output power and the current value of the at least one second output power is greater than the current difference predetermined value, the feedback control module is configured to clamp the voltage value of the output power, and the first active linear module is configured to cease performing a linear conversion, in order to control the voltage value of the first output power to be within the predetermined voltage range.

In an embodiment, when the difference value between the current value of the first output power and the current value of the at least one second output power is greater than the current difference predetermined value, the at least one second active linear module is configured to linearly convert the voltage value of the at least one second output power to be within the predetermined voltage range.

In an embodiment, when the difference value between the current value of the first output power and the current value of the at least one second output power is not greater than the current difference predetermined value, none the first active linear module and the at least one second active linear module is configured to perform the linear conversion.

In an embodiment, the first active linear module comprises a first active linear circuit and a first current detecting unit. The first active linear circuit is configured to linearly convert the output power into the first output power. The first current detecting unit is coupled to the first active linear circuit and the control module, and is configured to output a first current signal of the current signals. Each the at least one second active linear module comprises a second active linear circuit and a second current detecting unit. The second active linear circuit is configured to linearly convert the output power into the at least one second output power. The second current detecting unit is coupled to the second active linear circuit and the control module, and is configured to output a second current signal of the current signals.

In an embodiment, when the difference value between the current value of the first output power and the current value of the at least one second output power is greater than the current difference predetermined value, the first active linear circuit is configured to be controlled by the first current signal outputted by the first current detecting unit and is configured to cease performing the linear conversion, so that the output power is used as the first output power, and the second active linear circuit is configured to be controlled by the second current signal outputted by the second current detecting unit and is configured to linearly convert the output power into the at least one second output power.

In an embodiment, the first current detecting unit comprises a comparison unit comprising an input side and an output side. The input side is coupled to an output path of the power conversion module. The output side is coupled to the first active linear circuit and the control module. The comparison unit is configured to detect a voltage difference of the output path of the power conversion module, and the comparison unit is configured to output the first current signal based on the voltage difference to control the first active linear circuit to cease performing the linear conversion, and the control module is configured to control the feedback control module to increase the voltage value of the output power based on the first current signal.

In an embodiment, the first active linear circuit and the second active linear circuit are further coupled to the control module, and the control module is configured to determine whether the difference value between the current value of the first output power and the current value of the at least one second output power is greater than the current difference predetermined value or not. When the control module is configured to determine that the difference value between the current value of the first output power and the at least one current value of the second output power is greater than the current difference predetermined value, the control module is configured to output a disabling signal to control the first active linear circuit to cease performing the linear conversion, so that the output power is used as the first output power, and the control module is configured to output an enabling signal to control the second active linear circuit to linearly convert the output power into the at least one second output power.

In an embodiment, the first current detecting unit comprises a comparison unit comprising an input side and an output side. The input side is coupled to the output path of the power conversion module. The output side is coupled to the control module. The comparison unit is configured to detect the voltage difference of the output path of the power conversion module, and the comparison unit is configured to output the first current signal to the control module based on the voltage difference. The control module is configured to control the feedback control module to increase the voltage value of the output power based on the first current signal, and the control module is configured to output the disabling signal to control the first active linear circuit to cease performing the linear conversion based on the first current signal.

The present invention provides an operating method for a multi-output control system to overcome the prior art problems. Therefore, the operating method of the present invention comprises following steps. (a) A power conversion module, a first active linear module, at least one second active linear module, a control module and a feedback control module are provided, wherein the first active linear module and the at least one second active linear module are configured to receive an output power outputted by the power conversion module and convert the output power into a first output power and at least one second output power respectively. (b) The control module is configured to receive a plurality of current signals outputted by the first active linear module and the at least one second active linear module, and the control module is configured to control the feedback control module to adjust the output power based on the current signals. (c) The first active linear module and the at least one second active linear module are configured to know (namely, determine) whether a difference value between a current value of the first output power and a current value of the at least one second output power is greater than a current difference predetermined value based on the current signals, and the control module is configured to adjust a voltage value of the first output power and a voltage value of the at least one second output power to respectively be within a predetermined voltage range based on the current signals respectively.

In an embodiment, the step (b) further comprises: (b1) When the current value of the first output power or the current value of the at least one second output power increases, the control module is configured to control the feedback control module to increase a voltage value of the output power to maintain both the voltage value of the first output power and the voltage value of the at least one second output power to be within the predetermined voltage range.

In an embodiment, the step (c) further comprises: (c1) When the difference value between the current value of the first output power and the current value of the at least one second output power is greater than the current difference predetermined value, the feedback control module is configured to clamp the voltage value of the output power, and the first active linear module is configured to cease performing a linear conversion, in order to control the voltage value of the first output power to be within the predetermined voltage range.

In an embodiment, the step (c) further comprises: (c2) When the difference value between the current value of the first output power and the current value of the at least one second output power is greater than the current difference predetermined value, the at least one second active linear module is configured to linearly convert the voltage value of the at least one second output power to be within the predetermined voltage range.

In an embodiment, the step (c) further comprises: (c3) When the difference value between the current value of the first output power and the current value of the at least one second output power is not greater than the current difference predetermined value, both the first active linear module and the at least one second active linear module are configured to cease performing the linear conversion.

In an embodiment, the step (c) further comprises: (c4) The first active linear module comprises a first active linear circuit and a first current detecting unit. Each the at least one second active linear module comprises a second active linear circuit and a second current detecting unit. The current signals comprise a first current signal outputted by the first current detecting unit and a second current signal outputted by the second current detecting unit. When the difference value between the current value of the first output power and the current value of the at least one second output power is greater than the current difference predetermined value, the first active linear circuit is configured to be controlled by the first current signal outputted by the first current detecting unit and the first active linear circuit is configured to cease performing the linear conversion, so that the output power is used as the first output power, and the second active linear circuit is configured to be controlled by the second current signal outputted by the second current detecting unit and the second active linear circuit is configured to linearly convert the output power into the at least one second output power.

In an embodiment, the step (c4) further comprises: (c5) The first current detecting unit is configured to detect a voltage difference of an output path of the power conversion module, and the first current detecting unit is configured to output the first current signal based on the voltage difference to control the first active linear circuit to cease performing the linear conversion, and the control module is configured to control the feedback control module to increase the voltage value of the output power based on the first current signal.

In an embodiment, the step (c) further comprises: (c6) The first active linear module comprises a first active linear circuit and a first current detecting unit. Each the at least one second active linear module comprises a second active linear circuit and a second current detecting unit. The current signals comprise a first current signal outputted by the first current detecting unit and a second current signal outputted by the second current detecting unit. The control module is configured to determine whether the difference value between the current value of the first output power and the current value of the at least one second output power is greater than the current difference predetermined value or not. When the control module is configured to determine that the difference value between the current value of the first output power and the current value of the at least one second output power is greater than the current difference predetermined value, the control module is configured to output a disabling signal to control the first active linear circuit to cease performing the linear conversion, so that the output power is used as the first output power, and the control module is configured to output an enabling signal to control the second active linear circuit to linearly convert the output power into the at least one second output power.

In an embodiment, the step (c6) further comprises: (c7) The first current detecting unit is configured to detect the voltage difference of the output path of the power conversion module, and the first current detecting unit is configured to output the first current signal to the control module based on the voltage difference. The control module is configured to control the feedback control module to increase the voltage value of the output power based on the first current signal, and the control module is configured to output the disabling signal to control the first active linear circuit to cease performing the linear conversion based on the first current signal.

Please refer to the detailed descriptions and figures of the present invention mentioned below for further understanding the technology, method and effect of the present invention. The figures are only for references and descriptions, and the present invention is not limited by the figures.

DETAILED DESCRIPTION OF THE INVENTION

Figure 1:
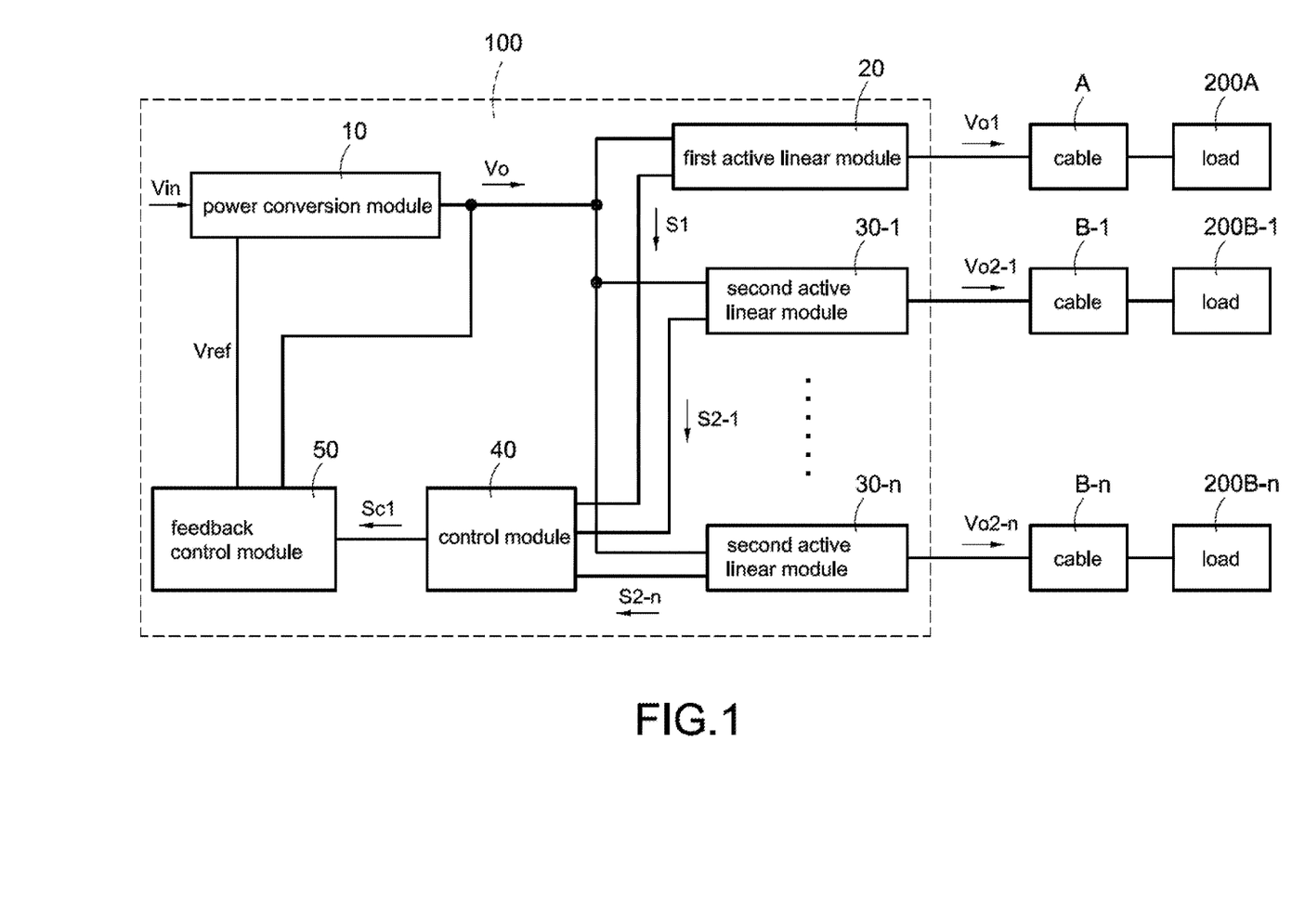
FIG. 1 shows a circuit block diagram of the multi-output control system of the present invention.

Please refer to following detailed description and figures for the technical content of the present invention:

FIG. 1 shows a circuit block diagram of the multi-output control system of the present invention. A multi-output control system 100 comprises a power conversion module 10, a first active linear module 20, a plurality of second active linear modules 30-1~30-n, a control module 40 and a feedback control module 50. The power conversion module 10 receives an input power Vin, and converts the input power Vin into an output power Vo. The first active linear module 20 is coupled to the power conversion module 10, and receives the output power Vo, and converts the output power Vo into a first output power Vo1. Each of the second active linear modules 30-1~30-n is coupled to the power conversion module 10, and converts the output power Vo into each of a plurality of second output powers Vo2-1~Vo2-n respectively. The control module 40 is coupled to the first active linear module 20 and each of the second active linear modules 30-1~30-n, and receives current signals S1, S2-1~S2-n (namely, a first current signal S1 and a plurality of second current signals S2-1~S2-n) outputted by the first active linear module 20 and each of the second active linear modules 30-1~30-n. The feedback control module 50 is coupled to the power conversion module 10 and the control module 40, and receives the output power Vo. As shown in FIG. 1, the power conversion module 10 of the present invention is coupled to a first active linear module 20 and at least one second active linear module 30-1~30-n. Therefore, in order to avoid the linear control method of the multi-output control system 100 of the present invention being misunderstood easily, the output current value of the first active linear module 20 in this embodiment is the maximal. Namely, the output current value of each of the second active linear modules 30-1~30-n is less than the output current value of the first active linear module 20.

More specifically, the first active linear module 20 is coupled to a load 200A, and supplies a first output power Vo1 to the load 200A through a cable A. Each of the second active linear modules 30-1~30-n is coupled to each of loads 200B-1~200B-n respectively, and supplies each of the second output powers Vo2-1~Vo2-n to each of the loads 200B-1~200B-n through each of cables B-1~B-n respectively. When the current required by the loads 200A, 200B-1~200B-n is changed, the control module 40 is aware of the change of the current value of the first output power Vo1 and the change of the current value of each of the second output powers Vo2-1~Vo2-n based on the first current signal S1 and the second current signals S2-1~S2-n which are supplied by the first active linear module 20 and at least one of the second active linear modules 30-1~30-n, and the control module 40 controls the feedback control module 50 to adjust the output power Vo based on the first current signal S1 and the second current signals S2-1~S2-n. The power conversion module 10 receives a conversion voltage Vref which is converted from the output power Vo by the feedback control module 50, and adjusts the duty cycle of the internal switch (not shown in FIG. 1) based on the conversion voltage Vref to stabilize the voltage value of the output power Vo. When the control module 40 is aware of the current value of the first output power Vo1 or the current value of the second output power Vo2-1~Vo2-*n* increasing based on the current signals S1, S2-1~S2-*n*, the control module 40 outputs a first control signal Sc1 to control the feedback control module 50 to increase the voltage value of the output power Vo to maintain both the voltage value of the first output power Vo1 and the voltage values of the second output powers Vo2-1~Vo2-*n* to be within a predetermined voltage range. Furthermore, when the current required by the loads 200A, 200B-1~200B-n increases, the currents sent to the loads 200A, 200B-1~200B-n through the cables A, B-1~B-n cause larger circuit losses (namely, the product of the impedance of the cable and the square of its flowing current), so that the voltage value supplied to the loads 200A, 200B-1~200B-n is not within the predetermined voltage range. Therefore, in order to ensure the voltage value supplied to the loads 200A, 200B-1~200B-n is within the predetermined voltage range, the control module 40 has to control the feedback control module 50 to increase the voltage value of the output power Vo to avoid the voltage value of the first output power Vo1 and the voltage values of the second output powers Vo2-1~Vo2-*n* not being within the predetermined voltage range causing that the voltage value supplied to the loads 200A, 200B-1~200B-n is not within the predetermined voltage range. Moreover, in the present invention, the predetermined voltage range is a rated voltage value of the preset output power Vo, which can be set as a voltage value (for example but not limited to 5V) or a voltage value range (for example but not limited to 9.5V~10.5V). Therefore, in the present invention, the predetermined voltage range can be adjusted based on the requirement of the user.

Please refer to FIG. 1 again. For the current value of the first output power Vo1 and the current values of the second output powers Vo2-1~Vo2-*n*, when a difference value between the current value of at least one of the second output powers Vo2-1~Vo2-*n* and the current value of the first output power Vo1 is greater than the preset current difference predetermined value, it means that the voltage value of the output power Vo adjusted by the control module 40 is already too high, so that the voltage value of the second output power Vo2-1~Vo2-*n* is not within the predetermined voltage range (namely, the voltage value of the output power Vo being too high will cause that the voltage value of the second output power Vo2-1~Vo2-*n* is too high), and thus the loads 200B-1~200B-n connected to the rear end is abnormal easily or damaged due to malfunctions. So the first active linear module 20 and the second active linear module 30-1~30-*n* of the present invention know (namely, determine) that whether the difference value between the current value of the first output power Vo1 and each current value of each of the second output powers Vo2-1~Vo2-*n* is greater than the current difference predetermined value based on the current signals S1, S2-1~S2-*n*, and adjust the voltage values of the first output power Vo1 and the second output powers Vo2-1~Vo2-*n* respectively to be within the predetermined voltage range based on the current signals S1, S2-1~S2-*n*. When the difference value between the current value of the first output power Vo1 and each current value of each of the second output powers Vo2-1~Vo2-*n* is not greater than the current difference predetermined value, the first active linear module 20 and each of the second active linear modules 30-1~30-*n* do not perform a linear conversion. When the difference value between the current value of the first output power Vo1 and at least one current value of the second output powers Vo2-1~Vo2-*n* is greater than the current difference predetermined value, the second active linear module 30-1~30-*n* having the difference value between the current value of the first output power Vo1 and the current value of the second output power Vo2-1~Vo2-*n* being greater than the current difference predetermined value will perform the linear conversion. For example, when the difference value between the current value of the first output power Vo1 and the current value of the second output power Vo2-1 is greater than the current difference predetermined value, the second active linear module 30-1 performs the linear conversion. Similarly, when the difference value between the current value of the first output power Vo1 and the current value of the second output power Vo2-*n* is greater than the current difference predetermined value, the second active linear module 30-*n* performs the linear conversion. Moreover, in the present invention, specific current value of the current difference predetermined value is not limited. The scope of the present invention should include any predetermined current value that makes the voltage value of the second output power Vo2-1~Vo2-*n* be within the predetermined voltage range when the difference value between the current value of the first output power Vo1 and the current value of the second output power Vo2-1~Vo2-*n* is not greater than the current difference predetermined value.

With the circuit structure and control method mentioned above, the multi-output control system 100 of the present invention does not perform the linear conversion when none the current difference values of a plurality of the active linear modules is greater than the current difference predetermined value, and only the active linear module that the current difference value is greater than the current difference predetermined value is started when the current difference values of a plurality of the active linear modules are greater than the current difference predetermined value, to save the energy consumption of the active linear module that does not work. When performing the average efficiency measurement, because the multiple outputs together pull (namely, load) the loadings of 25%, 50%, 75%, 100%, the current difference between the multiple outputs is very small so none the multiple active linear modules performs the linear conversion, so that the overall work efficiency of the multi-output control system 100 can increase.

For example, when the control module 40 knows (namely, determines) that the current value of the first output power Vo1 increases based on the current signals S1, S2-1~S2-*n* (namely, the control module 40 receives the current signals S1, S2-1~S2-*n* to know (namely, to determine) that the current value of the first output power Vo1 increases), the control module 40 controls the feedback control module 50 to increase the voltage value of the output power Vo to maintain the voltage values of the first output power Vo1 and the second output powers Vo2-1~Vo2-*n* to be within the predetermined voltage range. After that, if the current value of the first output power Vo1 continues to increase but the difference value between the current value of the first output power Vo1 and the current value of the second output power Vo2-1~Vo2-*n* is not greater than the current difference predetermined value, it means that although the control module 40 controls the feedback control module 50 to increase the voltage value of the output power Vo, the voltage value of the output power Vo after being heightened does not make the voltage values of the first output power Vo1 or the second output powers Vo2-1~Vo2-*n* be not within the predetermined voltage range. Namely, the voltage value of the output power Vo after being heightened does not make the voltage values of the first output power Vo1 or the second output powers Vo2-1~Vo2-*n* exceed the predetermined voltage range, so none the first active linear module 20 and the second active linear module 30-1~30-*n* performs the linear conversion, and thus the voltage value of the output power Vo is used as the voltage value of the first output power Vo1 and the voltage value of the second output power Vo2-1~Vo2-*n*.

To continue the example mentioned above, if the current value of the first output power Vo1 continues to increase so the difference values between the current value of the first output power Vo1 and the current values of two second output powers Vo2-1, Vo2-*n* are greater than the current difference predetermined value, it means that the control module 40 controlling the feedback control module 50 to increase the voltage value of the output power Vo already makes the voltage values of the first output power Vo1 or the second output powers Vo2-1~Vo2-*n* be not within the predetermined voltage range. At this time, in order to avoid the voltage value of the output power Vo being too high to be within the predetermined voltage range, the feedback control module 50 clamps the voltage value of the output power Vo, and the first active linear module 20 does not perform the linear conversion to control the voltage value of the first output power Vo1 to be within the predetermined voltage range (namely, the voltage value of the output power Vo is used as the voltage value of the first output power Vo1). Then, the corresponding second active linear modules 30-1, 30-*n* perform the linear conversion to linearly convert the voltage values of the second output powers Vo2-1, Vo2-*n* to be adjusted to be within the predetermined voltage range, to avoid the voltage values of the second output powers Vo2-1, Vo2-*n* exceeding the predetermined specifications of the multi-output control system 100 because none the voltage values of the second output powers Vo2-1, Vo2-*n* is within the predetermined range, which thus the loads 200B-1, 200B-n connected to the rear end is abnormal easily or damaged due to malfunctions. Moreover, in the present invention, there are two methods for the feedback control module 50 to clamp the output power Vo. One of the methods is that the feedback control module 50 can preset the upper limit of the voltage value of the output power Vo which is adjusted. When the voltage value of the output power Vo is too high and exceeds the upper limit of the voltage value preset by the feedback control module 50, the feedback control module 50 actively clamps the voltage value of the output power Vo. The other method is that the control module 40 controls the upper limit adjusted by the feedback control module 50. When the voltage value of the output power Vo is too high and is not within the predetermined voltage range, the first control signal Sc1 outputted by the control module 40 restricts the feedback control module 50 so the feedback control module 50 does not continue to increase the output power Vo, to clamp the voltage value of the output power Vo.

Figure 2A:
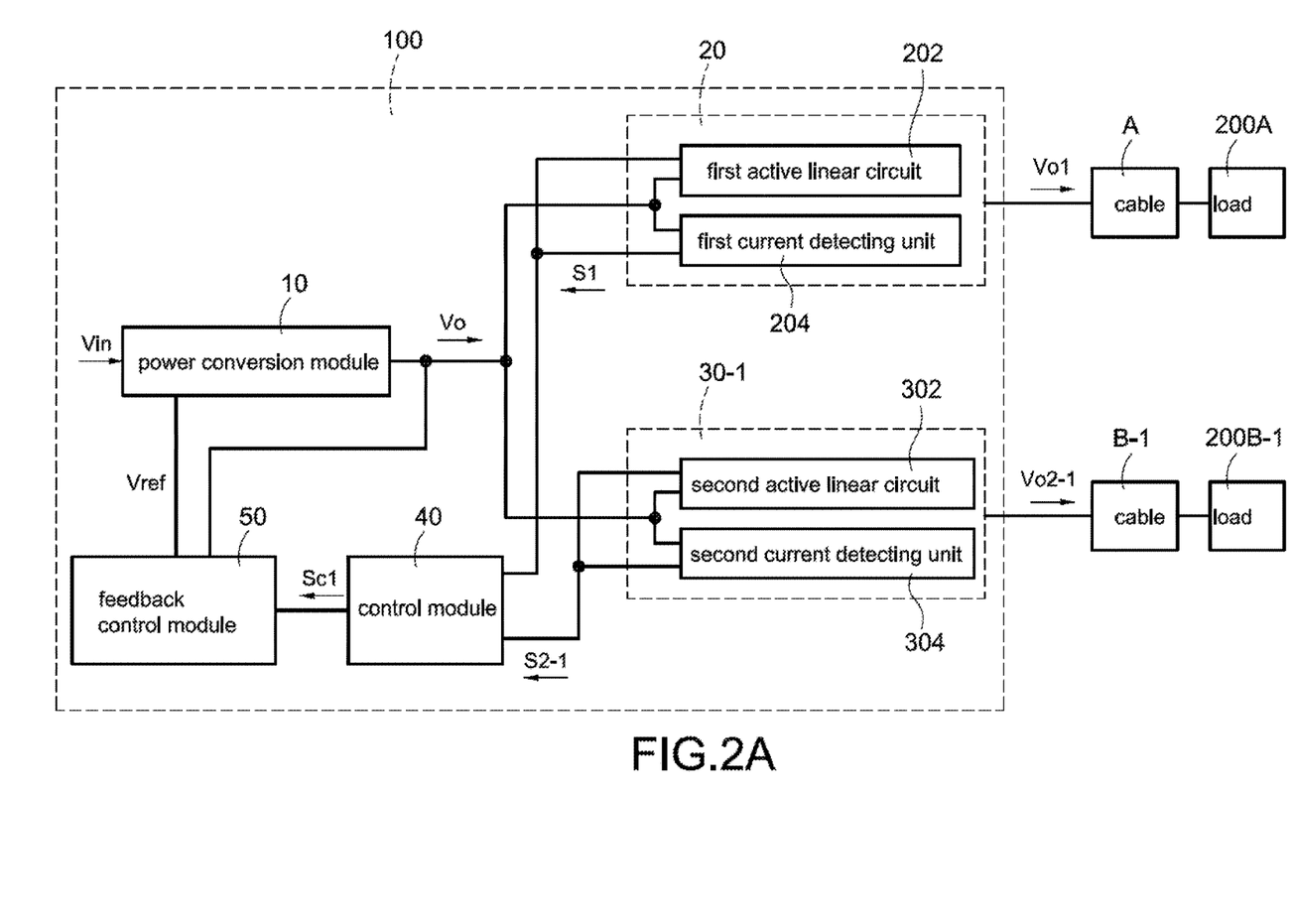
FIG. 2A shows a circuit block diagram of a first embodiment of the first active linear module and the second active linear module of the present invention.

FIG. 2A shows a circuit block diagram of a first embodiment of the first active linear module and the second active linear module of the present invention. Please refer to FIG. 1 again. In the present invention, because the internal block structures of each of the second active linear modules 30-1~30-*n* are the same, for convenient description in the embodiment, the second active linear modules 30-1~30-*n* and the second output powers Vo2-1~Vo2-*n* shown in FIG. 1 will be shown as only one second active linear module 30-1 and only one second output power Vo2-1. As shown in FIG. 2A, the first active linear module 20 comprises a first active linear circuit 202 and a first current detecting unit 204. The first active linear circuit 202 linearly converts the output power Vo into the first output power Vo1 and outputs the first output power Vo1 to the load 200A through the cable A. The first current detecting unit 204 is coupled to the first active linear circuit 202 and the control module 40, and outputs a first current signal S1 to the first active linear circuit 202 and the control module 40. The second active linear module 30-1 comprises a second active linear circuit 302 and a second current detecting unit 304. The second active linear circuit 302 linearly converts the output power Vo into the second output power Vo2-1 and outputs the second output power Vo2-1 to the load 200B-1 through the cable B-1. The second current detecting unit 304 is coupled to the second active linear circuit 302 and the control module 40, and outputs a second current signal S2-1 to the second active linear circuit 302 and the control module 40.

When the difference value between the current value of the first output power Vo1 and the current value of the second output power Vo2-1 is greater than the current difference predetermined value, the control module 40 outputs the first control signal Sc1 to the feedback control module 50. The feedback control module 50 increases the output power Vo based on the first control signal Sc1, and the feedback control module 50 clamps the output power Vo to be within the predetermined voltage range. At this time, the first active linear circuit 202 is controlled by the first control signal Sc1 outputted by the first current detecting unit 204 to not perform the linear conversion, so the output power Vo is used as the first output power Vo1. The second active linear circuit 302 is controlled by the second current signal S2-1 outputted by the second current detecting unit 304 to linearly convert the output power Vo into the second output power Vo2-1. Therefore, in this embodiment, the first current detecting unit 204 controls the first active linear circuit 202 to not perform the linear conversion, and the second current detecting unit 304 controls the second active linear circuit 302 to actively and linearly convert the output power Vo into the second output power Vo2-1, so that both the first output power Vo1 and the second output power Vo2-1 are within the predetermined voltage range.

Figure 2B:
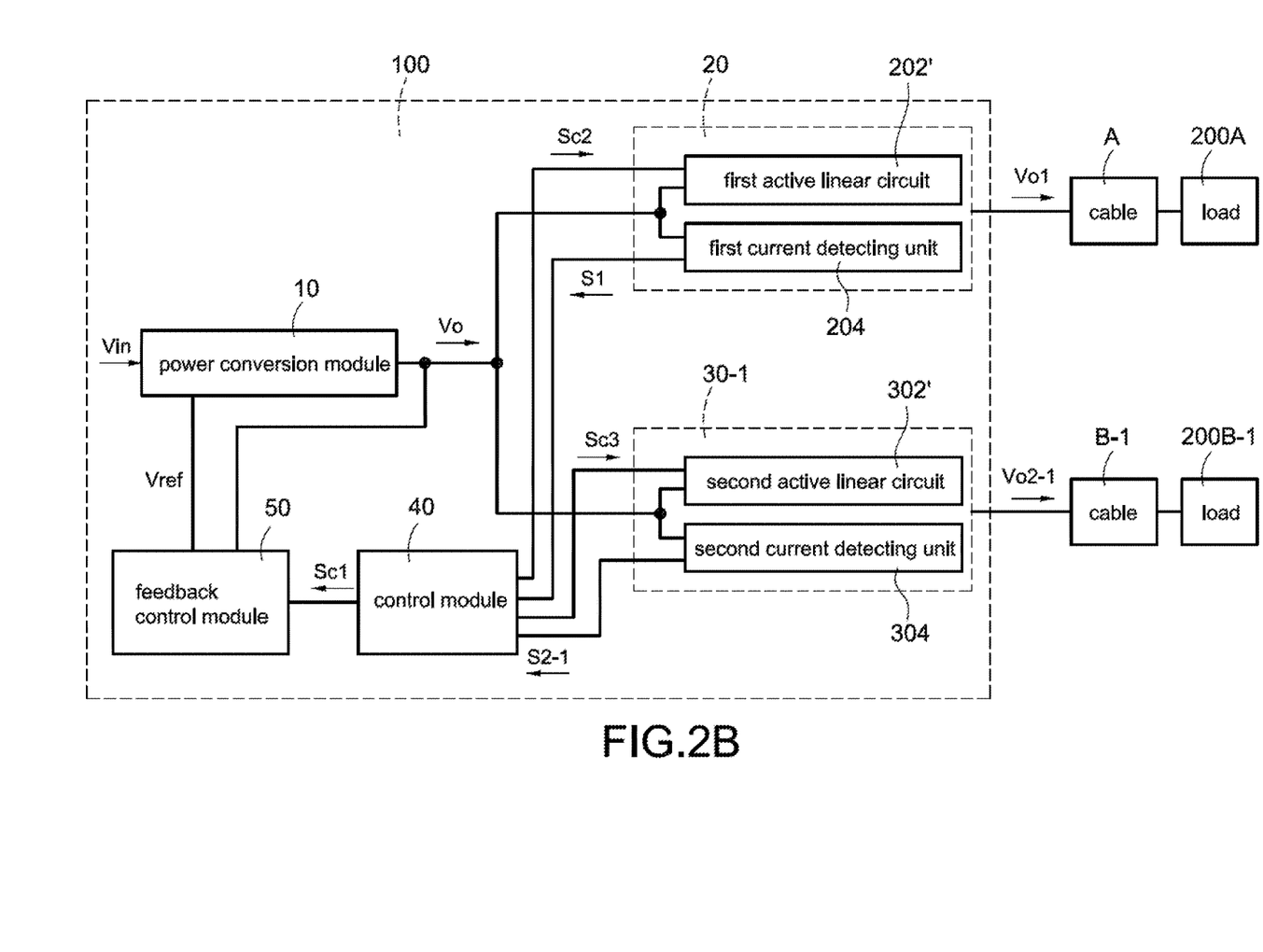
FIG. 2B shows a circuit block diagram of a second embodiment of the first active linear module and the second active linear module of the present invention.

FIG. 2B shows a circuit block diagram of a second embodiment of the first active linear module and the second active linear module of the present invention. Please refer to FIGS. 1~2A again. This embodiment is similar to the first embodiment of FIG. 2A that the second active linear modules 30-1~30-*n* and the second output powers Vo2-1~Vo2-*n* shown in FIG. 1 are only shown as only one second active linear module 30-1 and only second output power Vo2-1. As shown in FIG. 2B, the difference between this embodiment and the first embodiment of FIG. 2A is that a first active linear circuit 202' is coupled to the control module 40, and the first current detecting unit 204 outputs the first current signal S1 to the control module 40. A second active linear circuit 302' is coupled to the control module 40, and the second current detecting unit 304 outputs the second current signal S2-1 to the control module 40. The control module 40 determines whether the difference value between the current value of the first output power Vo1 and the current value of the second output power Vo2-1 is greater than the current difference predetermined value based on the first current signal S1 and the second current signal S2-1, and outputs a second control signal Sc2 to control the first active linear circuit 202', and outputs a third control signal Sc3 to control the second active linear circuit 302'. The circuit connection relationship which is not described in this embodiment is similar to the description of the first embodiment of FIG. 2A and is not repeated here.

When the control module 40 determines whether the difference value between the current value of the first output power Vo1 and the current value of the second output power Vo2-1 is greater than the current difference predetermined value based on the first current signal S1 and the second current signal S2-1, the control module 40 outputs the first control signal Sc1 to the feedback control module 50. The feedback control module 50 increases the output power Vo based on the first control signal Sc1, and the feedback control module 50 clamps the output power Vo to be within the predetermined voltage range. At this time, the control module 40 outputs the second control signal Sc2 (namely, the disabling second control signal Sc2) to control the first active linear circuit 202' to cease performing the linear conversion, so the output power Vo is used as the first output power Vo1, and outputs the third control signal Sc3 (namely, the enabling third control signal Sc3) to control the second active linear circuit 302' to linearly convert the output power Vo into the second output power Vo2-1. Therefore, in this embodiment, the control module 40 outputs the second control signal Sc2 to control the first active linear circuit 202' to not perform the linear conversion, and outputs the third control signal Sc3 to control the second active linear circuit 302' to actively and linearly convert the output power Vo into the second output power Vo2-1, so that both the first output power Vo1 and the second output power Vo2-1 are within the predetermined voltage range.

Figure 3A:
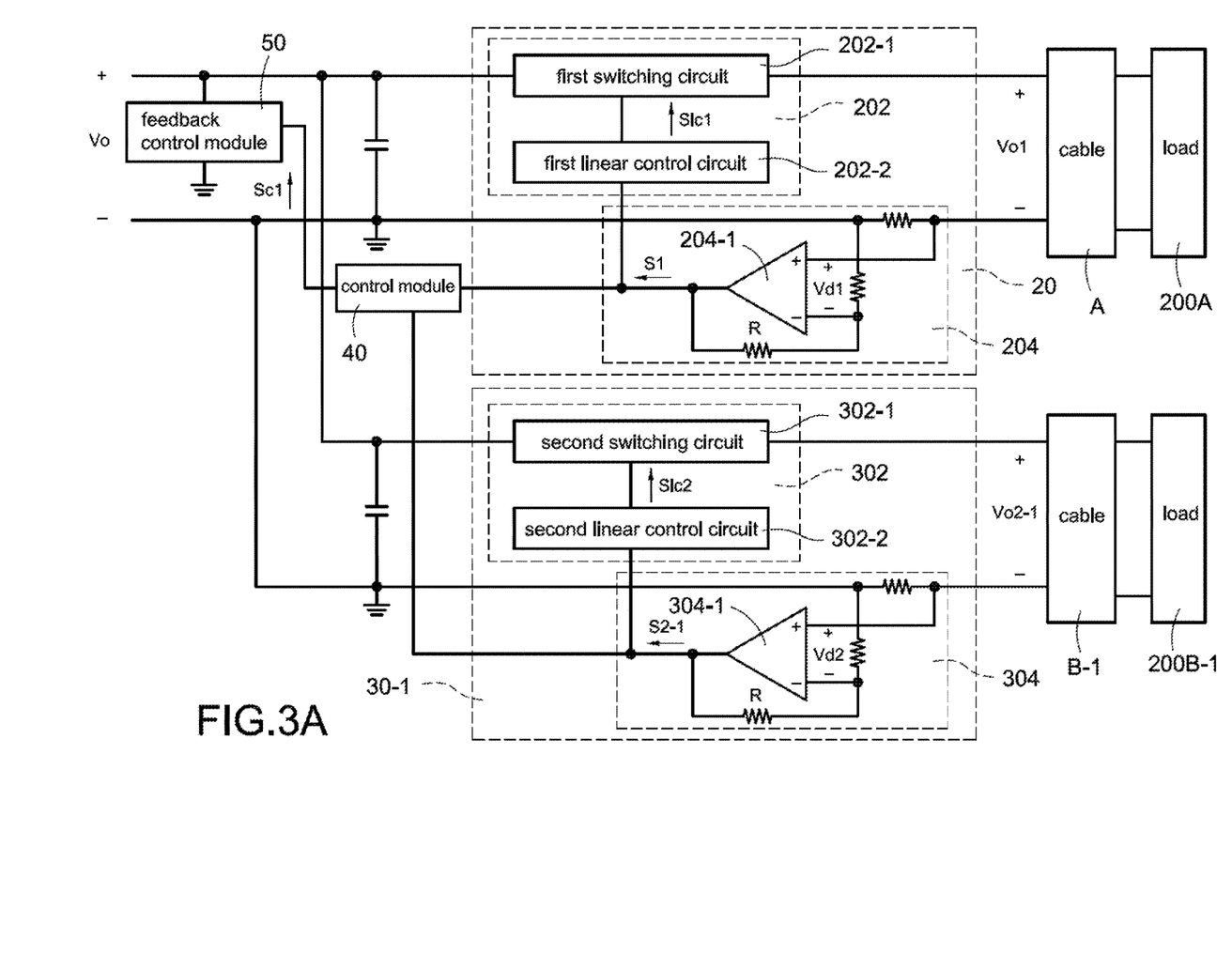
FIG. 3A shows a detailed circuit block diagram of the first embodiment of the first active linear module and the second active linear module of the present invention.

FIG. 3A shows a detailed circuit block diagram of the first embodiment of the first active linear module and the second active linear module of the present invention. Please refer to FIGS. 1~2A again. The circuit connection relationship of this embodiment is mainly in accordance with the connection relationship of the first active linear module 20 and the second active linear module 30-1 shown in FIG. 2A. In the present invention, because the internal detailed circuit block structures of each of the second active linear modules 30-1~30-n are the same, for convenient description in the embodiment, only the first active linear module 20 and the second active linear module 30-1 are shown. As shown in FIG. 3A, the first active linear circuit 202 comprises a first switching circuit 202-1 and a first linear control circuit 202-2, and the first current detecting unit 204 comprises a first comparison unit 204-1. The first switching circuit 202-1 is coupled to an output path of the power conversion module 10, and the first linear control circuit 202-2 is coupled to the first switching circuit 202-1. The first comparison unit 204-1 comprises an input side and an output side. The input side of the first comparison unit 204-1 is coupled to the output path of the power conversion module 10. The output side of the first comparison unit 204-1 is coupled to the first linear control circuit 202-2 and the control module 40. The second active linear circuit 302 comprises a second switching circuit 302-1 and a second linear control circuit 302-2, and the second current detecting unit 304 comprises a second comparison unit 304-1. The second switching circuit 302-1 is coupled to the output path of the power conversion module 10, and the second linear control circuit 302-2 is coupled to the second switching circuit 302-1. The second comparison unit 304-1 comprises an input side and an output side. The input side of the second comparison unit 304-1 is coupled to the output path of the power conversion module 10. The output side of the second comparison unit 304-1 is coupled to the second linear control circuit 302-2 and the control module 40.

More specifically, the first switching circuit 202-1 of the first active linear circuit 202 is coupled to the power output path of the power conversion module 10, and controls whether the output power Vo is converted into the first output power Vo1 or not, and supplies the first output power Vo1 to the load 200A through the cable A. Based on the first current signal S1, the first linear control circuit 202-2 outputs the first linear control signal Slc1 to control whether the first switching circuit 202-1 linearly converts the output power Vo into the first output power Vo1 or not. The input side of the first comparison unit 204-1 of the first current detecting unit 204 is coupled to a ground path of the power conversion module 10, and a change of a first voltage difference Vd1 between two points on the ground path is detected to know (namely, determine) a change of the current value of the first output power Vo1. Then the first comparison unit 204-1 generates the first current signal S1 based on the first voltage difference Vd1, and outputs the first current signal S1 to the first linear control circuit 202-2 and the control module 40 through the output side. The specific connection relationship of the second active linear circuit 302 and the second current detecting unit 304 and the control method are the same as those of the first active linear circuit 202 and the first current detecting unit 204, and are not repeated here.

Furthermore, when the difference value between the current value of the first output power Vo1 and the current value of the second output power Vo2-1 is greater than the current difference predetermined value, the first comparison unit 204-1 detects the first voltage difference Vd1 on the output path of the power conversion module 10 (namely the ground path of the power conversion module 10) through the input side of the first comparison unit 204-1, and the first comparison unit 204-1 outputs the first current signal S1 to the first linear control circuit 202-2 and the control module 40 based on the first voltage difference Vd1. The second comparison unit 304-1 detects the second voltage difference Vd2 on the output path of the power conversion module 10 (namely the ground path of the power conversion module 10) through the input side of the second comparison unit 304-1, and the second comparison unit 304-1 outputs the second current signal S2-1 to the second linear control circuit 302-2 and the control module 40 based on the second voltage difference Vd2. The control module 40 controls the feedback control module 50 to increase the voltage value of the output power Vo based on the first current signal S1 and the second current signal S2-1 (namely, the voltage value of the output power Vo increases based on the first current signal S1 for the first output power Vo1 having the highest current value), and the feedback control module 50 clamps the voltage value of the output power Vo to be within the predetermined voltage range (namely, the output power Vo is clamped at the highest upper limit of the predetermined voltage range). Then, based on the first current signal S1, the first linear control circuit 202-2 outputs the first linear control signal Slc1 to control the first switching circuit 202-1 to not perform the linear conversion, so the output power Vo is used as the first output power Vo1. Based on the second current signal S2-1, the second linear control circuit 302-2 outputs the second linear control signal Slc2 to control the second switching circuit 302-1 to linearly convert the output power Vo into the second output power Vo2-1. By the first linear control circuit 202-2 controlling the first switching circuit 202-1 to not perform the linear conversion and the second linear control circuit 302-2 controlling the second switching circuit 302-1 to linearly convert the output power Vo into the second output power Vo2-1 mentioned above, the voltage value of the first output power Vo1 and the voltage value of the second output power Vo2-1 are maintained to be within the predetermined voltage range, so the output voltage of the multi-output control system 100 meets the predetermined specifications. Moreover, in this embodiment, the first linear control circuit 202-2 and the second linear control circuit 302-2 can be connected to each other and compare the current signals of the first linear control circuit 202-2 and the second linear control circuit 302-2 (namely, the first current signal S1 and the second current signal S2-1) to more accurately determine whether the difference value between the current value of the first output power Vo1 and the current value of the second output power Vo2-1 is greater than the current difference predetermined value or not.

Figure 3B:
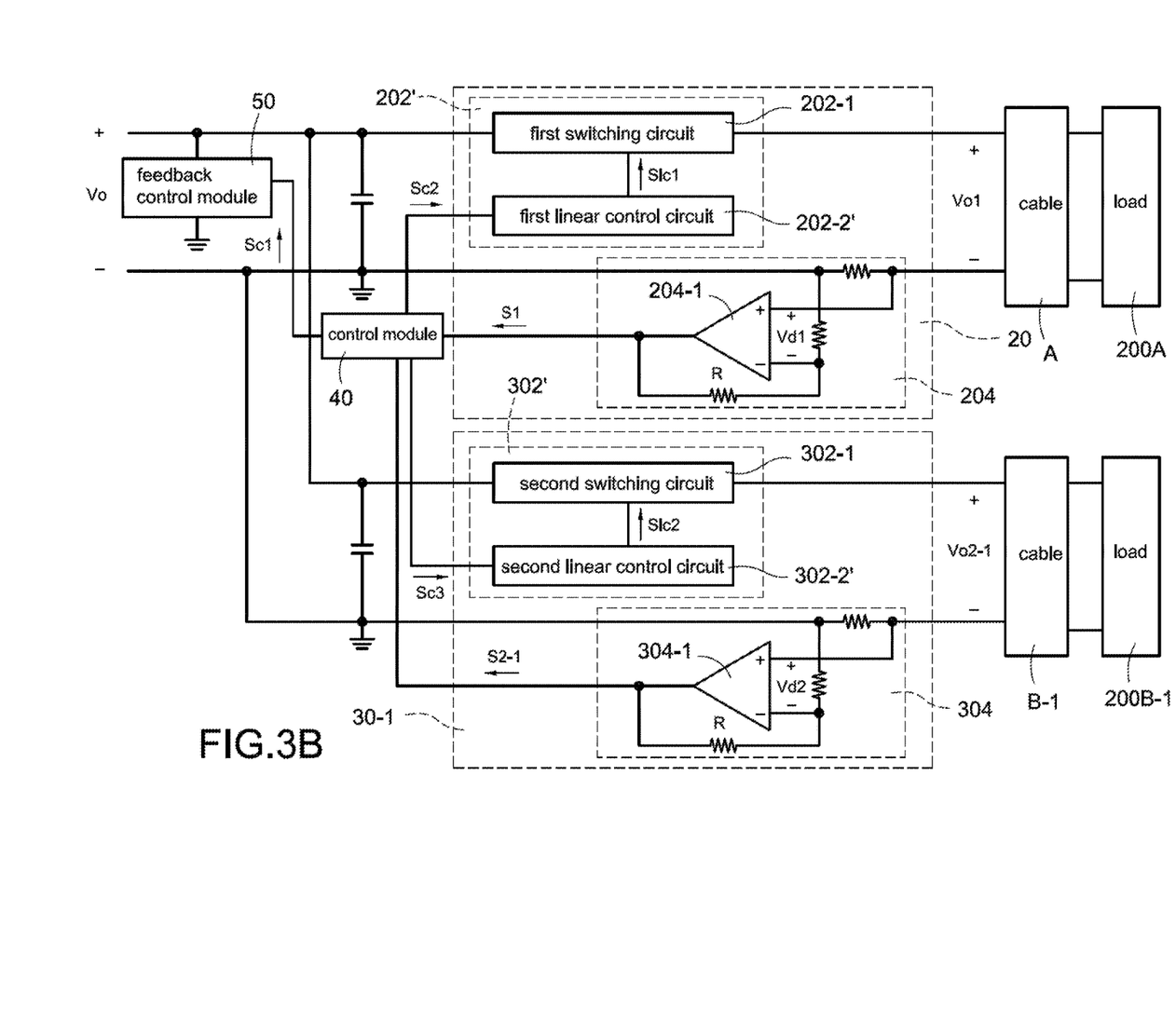
FIG. 3B shows a detailed circuit block diagram of the second embodiment of the first active linear module and the second active linear module of the present invention.

FIG. 3B shows a detailed circuit block diagram of the second embodiment of the first active linear module and the second active linear module of the present invention. Please refer to FIGS. 1~3A again. The circuit connection relationship of this embodiment is mainly in accordance with the connection relationship of the first active linear module 20 and the second active linear module 30-1 shown in FIG. 2B. This embodiment is similar to the first embodiment of FIG. 3A that only the first active linear module 20 and the second active linear module 30-1 are shown. As shown in FIG. 3B, the difference between this embodiment and the first embodiment of FIG. 3A is that the first linear control circuit 202-2' is coupled to the control module 40, and the output side of the first comparison unit 204-1 outputs the first current signal S1 only to the control module 40. The second linear control circuit 302-2' is coupled to the control module 40, and the output side of the second comparison unit 304-1 outputs the second current signal S2-1 only to the control module 40. The control module 40 determines whether the difference value between the current value of the first output power Vo1 and the current value of the second output power Vo2-1 is greater than the current difference predetermined value based on the first current signal S1 and the second current signal S2-1, and outputs the second control signal Sc2 to control the first linear control circuit 202-2', and outputs the third control signal Sc3 to control the second linear control circuit 302-2'.

Furthermore, the first comparison unit 204-1 outputs the first current signal S1 to the control module 40 based on the first voltage difference Vd1, and the second comparison unit 304-1 outputs the second current signal S2-1 to the control module 40 based on the second voltage difference Vd2. The control module 40 determines whether the difference value between the current value of the first output power Vo1 and the current value of the second output power Vo2-1 is greater than the current difference predetermined value or not. When the difference value between the current value of the first output power Vo1 and the current value of the second output power Vo2-1 is greater than the current difference predetermined value, the first linear control circuit 202-2' outputs the first linear control signal Slc1 to control the first switching circuit 202-1 to not perform the linear conversion based on the disabling second control signal Sc2, so the output power Vo is used as the first output power Vo1. The second linear control circuit 302-2' outputs the second linear control signal Slc2 to control the second switching circuit 302-1 to linearly convert the output power Vo into the second output power Vo2-1 based on the enabling third control signal Sc3. The circuit connection relationship and the control method which are not described in this embodiment are similar to the description of the first embodiment of FIG. 3A and are not repeated here. Moreover, in the present invention, the first switching circuit 202-1 and the second switching circuit 302-1 can be the power delivery control circuit and the blocking MOSFETs of the power conversion module 10. The power delivery control circuit controls the blocking MOSFETs to be turned on or off, and controls whether the output power Vo is linearly converted or not by receiving the first linear control signal Slc1 and the second linear control signal Slc2. Besides, in the present invention, the signal magnification of the first current signal S1 and the second current signal S2-1 which are outputted by the first comparison unit 204-1 and the second comparison unit 304-1 is magnified by a magnification adjusting resistor R, so that the first linear control circuit 202-2, the second linear control circuit 302-2 and the control module 40 which are coupled to the rear end can more accurately distinguish the first current signal S1 and the second current signal S2-1, but the present invention is not limited to it. In other words, the output sides of the first comparison unit 204-1 and the second comparison unit 304-1 can be, for example but not limited to, coupled to magnification adjusting units (not shown in the figures) to magnify or reduce the first current signal S1 and the second current signal S2-1 by the magnification adjusting units.

Figure 4:
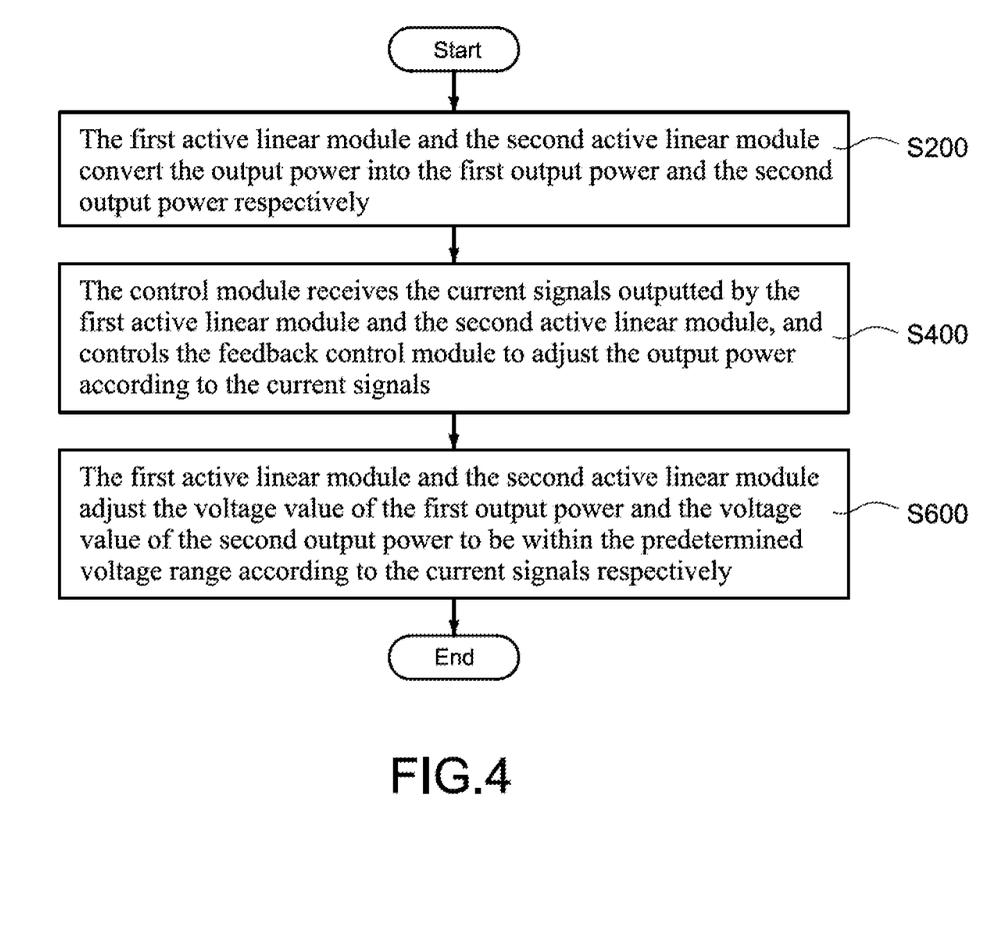
FIG. 4 shows a flow chart of the operating method for the multi-output control system of the present invention.

FIG. 4 shows a flow chart of the operating method for the multi-output control system of the present invention. Please refer to FIGS. 1~3B again. A multi-output control system 100 comprises a power conversion module 10, a first active linear module 20, a plurality of second active linear modules 30-1~30-n, a control module 40 and a feedback control module 50. An operating method for the multi-output control system 100 comprises following steps. The first active linear module and the second active linear module convert the output power into the first output power and the second output power respectively (S200). The first active linear module 20 and the second active linear module 30-1~30-n receive an output power Vo outputted by the power conversion module 10 and convert the output power Vo into a first output power Vo1 and a second output power Vo2-1~Vo2-n respectively. Then the control module receives the current signals outputted by the first active linear module and the second active linear module, and controls the feedback control module to adjust the output power based on the current signals (S400). The control module 40 receives a first current signal S1 outputted by the first active linear module 20 and the second current signals S2-1~S2-n of each of the second active linear modules 30-1~30-n, and controls the feedback control module 50 to adjust the output power Vo to maintain the output power Vo to be within a predetermined voltage range based on the first current signal S1 and the second current signals S2-1~S2-n. When a current value of the first output power Vo1 or a current value of the second output power Vo2-1~Vo2-n increases, the control module 40 controls the feedback control module 50 to increase a voltage value of the output power Vo to maintain both a voltage value of the first output power Vo1 and a voltage value of the second output power Vo2-1~Vo2-n to be within the predetermined voltage range. Finally, the first active linear module and the second active linear module adjust the voltage value of the first output power and the voltage value of the second output power to be within the predetermined voltage range based on the current signals respectively (S600). The first active linear module 20 and the second active linear module 30-1~30-n know (namely, determine) whether the difference value between the current value of the first output power Vo1 and the current value of the second output power Vo2-1~Vo2-n is greater than the current difference predetermined value based on the first current signal S1 and the second current signal S2-1~S2-n, and the voltage value of the first output power Vo1 and the voltage value of the second output power Vo2-1~Vo2-n are adjusted to be within the predetermined voltage range based on the first current signal S1 and the second current signal S2-1~S2-n respectively, to avoid the voltage value of the second output power Vo2-1~Vo2-n exceeding the predetermined specifications of the multi-output control system 100 because the voltage value of the second output power Vo2-1~Vo2-$n$ is not within the predetermined range, which thus loads 200B-1~200B-$n$ connected to the rear end are abnormal easily or damaged due to malfunctions. Furthermore, the step S600 further comprises two different states. One of them is that when the difference value between the current value of the first output power Vo1 and the current value of the second output power Vo2-1~Vo2-$n$ is greater than the current difference predetermined value, the feedback control module 50 clamps the voltage value of the output power Vo to avoid the voltage value of the output power Vo being not able to maintain within the predetermined voltage range. At this time, the first active linear module 20 does not perform the linear conversion, so the output power Vo is used as the first output power Vo1, and the voltage value of the first output power Vo1 is controlled to be within the predetermined voltage range. Then the second active linear module 30-1~30-$n$ linearly converts the output power Vo into the second output power Vo2-1~Vo2-$n$, to control the voltage value of the second output power Vo2-1~Vo2-$n$ to be within the predetermined voltage range. The other state of the step S600 is that when the difference value between the current value of the first output power Vo1 and the current value of the second output power Vo2-1~Vo2-$n$ is not greater than the current difference predetermined value, none the first active linear module 20 and the second active linear module 30-1~30-$n$ performs the linear conversion, so the output power Vo is used as the first output power Vo1 and the second output power Vo2-1~Vo2-$n$.

More specifically, the first active linear module 20 comprises a first active linear circuit 202 and a first current detecting unit 204. Each of the second active linear modules 30-1~30-$n$ comprises a second active linear circuit 302 and a second current detecting unit 304. Moreover, the step S600 further comprises two different control methods. One of them is that when the difference value between the current value of the first output power Vo1 and the current value of the second output power Vo2-1~Vo2-$n$ is greater than the current difference predetermined value, the first current detecting unit 204 detects a first voltage difference Vd1 of an output path of the power conversion module 10, and the second current detecting unit 304 detects a second voltage difference Vd2 of the output path of the power conversion module 10. Then the control module 40 controls the feedback control module 50 to increase the voltage value of the output power Vo based on the first current signal S1, and the first current detecting unit 204 outputs the first current signal S1 to control the first active linear circuit 202 to cease performing the linear conversion based on the first voltage difference Vd1, so the output power Vo is used as the first output power Vo1. The second current detecting unit 304 outputs the second current signal S2-1~S2-$n$ to control the second active linear circuit 302 to linearly convert the output power Vo into the second output power Vo2-1~Vo2-$n$ based on the second voltage difference Vd2.

The other control method of the step S600 is that the control module 40 determines whether the difference value between the current value of the first output power Vo1 and the current value of the second output power Vo2-1~Vo2-$n$ is greater than the current difference predetermined value or not. When the control module 40 determines that the difference value between the current value of the first output power Vo1 and the current value of the second output power Vo2-1~Vo2-$n$ is greater than the current difference predetermined value, the first current detecting unit 204 detects the first voltage difference Vd1 of the output path of the power conversion module 10, and the second current detecting unit 304 detects the second voltage difference Vd2 of the output path of the power conversion module 10. Then the control module 40 controls the feedback control module 50 to increase the voltage value of the output power Vo based on the first current signal S1, and the first current detecting unit 204 outputs the first current signal S1 to the control module 40 based on the first voltage difference Vd1. The second current detecting unit 304 outputs the second current signal S2-1~S2-$n$ to the control module 40 based on the second voltage difference Vd2. Based on the first current signal S1, the control module 40 outputs the disabling second control signal Sc2 to control the first active linear circuit 202 to cease performing the linear conversion, so the output power Vo is used as the first output power Vo1. Based on the second current signal S2-1~S2-$n$, the control module 40 outputs the enabling third control signal Sc3 to control the second active linear circuit 302 to linearly convert the output power Vo into the second output power Vo2-1~Vo2-$n$.

In conclusion, one or more embodiments of the present invention at least comprise one of the following advantages:

1. Because the multi-output control system of the present invention can control the voltage values of each of the output powers to be within the predetermined range, the efficiency of avoiding the voltage value of the output power which is sent to the load which is connected to the rear side exceeding the specifications causing that the load is abnormal easily or damaged due to malfunctions can be achieved.

2. Because the multi-output control system of the present invention can start only the active linear module with the current difference value being greater than the current difference predetermined value when the current difference value of a plurality of the active linear modules is greater than the current difference predetermined value, the efficiency of saving the energy consumption of the active linear module that does not work can be achieved.

3. Because the multi-output control system of the present invention does not perform the linear conversion when the current difference value of a plurality of the active linear modules is not greater than the current difference predetermined value, when performing the average efficiency measurement, the current difference between a plurality of the outputs is small so none the active linear modules performs the linear conversion, so that the efficiency of increasing the overall work efficiency of the multi-output control system can be achieved.

4. Because the active linear modules of the multi-output control system of the present invention can be designed directly to apply the blocking MOSFETs of the power delivery control circuit, the following efficiency can be achieved: the linear control circuit is not required; the cost of the whole circuit of the multi-output control system is reduced; the complexity of the control of the circuit is reduced; the conversion loss of the power converter is reduced to increase the system efficiency.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A multi-output control system comprising:
a power conversion module configured to output an output power;
a first active linear module coupled to the power conversion module and configured to convert the output power into a first output power;
at least one second active linear module coupled to the power conversion module and configured to convert the output power into at least one second output power;
a control module coupled to the first active linear module and the at least one second active linear module, and configured to receive a plurality of current signals outputted by the first active linear module and the at least one second active linear module; and
a feedback control module coupled to the power conversion module and the control module, and configured to receive the output power,
wherein the control module is configured to control the feedback control module to adjust the output power based on the current signals; the first active linear module and the at least one second active linear module are configured to determine whether a difference value between a current value of the first output power and a current value of the at least one second output power is greater than a current difference predetermined value based on the current signals, and the control module is configured to adjust a voltage value of the first output power and a voltage value of the at least one second output power to respectively be within a predetermined voltage range based on the current signals respectively.

2. The multi-output control system in claim 1, wherein when the control module determines that the current value of the first output power or the current value of the at least one second output power increases based on the current signals, the control module is configured to control the feedback control module to increase a voltage value of the output power to maintain both the voltage value of the first output power and the voltage value of the at least one second output power to be within the predetermined voltage range.

3. The multi-output control system in claim 1, wherein when the difference value between the current value of the first output power and the current value of the at least one second output power is greater than the current difference predetermined value, the feedback control module is configured to clamp a voltage value of the output power, and the first active linear module is configured to cease performing a linear conversion, in order to control the voltage value of the first output power to be within the predetermined voltage range.

4. The multi-output control system in claim 1, wherein when the difference value between the current value of the first output power and the current value of the at least one second output power is greater than the current difference predetermined value, the at least one second active linear module is configured to linearly convert the voltage value of the at least one second output power to be within the predetermined voltage range.

5. The multi-output control system in claim 1, wherein when the difference value between the current value of the first output power and the current value of the at least one second output power is not greater than the current difference predetermined value, none the first active linear module and the at least one second active linear module is configured to perform a linear conversion.

6. The multi-output control system in claim 1, wherein the first active linear module comprises:

a first active linear circuit configured to linearly convert the output power into the first output power; and
a first current detecting unit coupled to the first active linear circuit and the control module, and configured to output a first current signal of the current signals,
wherein each of the at least one second active linear module comprises:
a second active linear circuit configured to linearly convert the output power into the at least one second output power; and
a second current detecting unit coupled to the second active linear circuit and the control module, and configured to output a second current signal of the current signals.

7. The multi-output control system in claim 6, wherein when the difference value between the current value of the first output power and the current value of the at least one second output power is greater than the current difference predetermined value, the first active linear circuit is configured to be controlled by the first current signal outputted by the first current detecting unit and the first active linear circuit is configured to cease performing a linear conversion, so that the output power is used as the first output power, and the second active linear circuit is configured to be controlled by the second current signal outputted by the second current detecting unit and the second active linear circuit is configured to linearly convert the output power into the at least one second output power.

8. The multi-output control system in claim 7, wherein the first current detecting unit comprises:
a comparison unit comprising an input side and an output side, the input side coupled to an output path of the power conversion module, the output side coupled to the first active linear circuit and the control module,
wherein the comparison unit is configured to detect a voltage difference of the output path of the power conversion module, and the comparison unit is configured to output the first current signal based on the voltage difference to control the first active linear circuit to cease performing the linear conversion, and the control module is configured to control the feedback control module to increase a voltage value of the output power based on the first current signal.

9. The multi-output control system in claim 6, wherein the first active linear circuit and the second active linear circuit are further coupled to the control module, and the control module is configured to determine whether the difference value between the current value of the first output power and the current value of the at least one second output power is greater than the current difference predetermined value; when the control module is configured to determine that the difference value between the current value of the first output power and the current value of the at least one second output power is greater than the current difference predetermined value, the control module is configured to output a disabling signal to control the first active linear circuit to cease performing a linear conversion, so that the output power is used as the first output power, and the control module is configured to output an enabling signal to control the second active linear circuit to linearly convert the output power into the at least one second output power.

10. The multi-output control system in claim 9, wherein the first current detecting unit comprises:
a comparison unit comprising an input side and an output side, the input side coupled to an output path of the power conversion module, the output side coupled to the control module, wherein the comparison unit is configured to detect a voltage difference of the output path of the power conversion module, and the comparison unit is configured to output the first current signal to the control module based on the voltage difference; the control module is configured to control the feedback control module to increase a voltage value of the output power based on the first current signal, and the control module is configured to output the disabling signal to control the first active linear circuit to cease performing the linear conversion based on the first current signal.

11. An operating method for a multi-output control system, the operating method comprising:
   (a) providing a power conversion module, a first active linear module, at least one second active linear module, a control module and a feedback control module, wherein the first active linear module and the at least one second active linear module are configured to receive an output power outputted by the power conversion module, and are configured to convert the output power into a first output power and at least one second output power respectively;
   (b) the control module receiving a plurality of current signals outputted by the first active linear module and the at least one second active linear module, and controlling the feedback control module to adjust the output power based on the current signals; and
   (c) the first active linear module and the at least one second active linear module being aware that whether a difference value between a current value of the first output power and a current value of the at least one second output power is greater than a current difference predetermined value based on the current signals, and adjusting a voltage value of the first output power and a voltage value of the at least one second output power to respectively be within a predetermined voltage range based on the current signals respectively.

12. The operating method in claim 11, wherein the step (b) further comprises:
   (b1) the control module controlling the feedback control module to increase a voltage value of the output power to maintain both the voltage value of the first output power and the voltage value of the at least one second output power to be within the predetermined voltage range when the current value of the first output power or the current value of the at least one second output power increases.

13. The operating method in claim 11, wherein the step (c) further comprises:
   (c1) the feedback control module clamping a voltage value of the output power, and the first active linear module not performing a linear conversion, in order to control the voltage value of the first output power to be within the predetermined voltage range when the difference value between the current value of the first output power and the current value of the at least one second output power is greater than the current difference predetermined value.

14. The operating method in claim 11, wherein the step (c) further comprises:
   (c2) the at least one second active linear module linearly converting the voltage value of the at least one second output power to be within the predetermined voltage range when the difference value between the current value of the first output power and the current value of the at least one second output power is greater than the current difference predetermined value.

15. The operating method in claim 11, wherein the step (c) further comprises:
   (c3) none the first active linear module and the at least one second active linear module performing a linear conversion when the difference value between the current value of the first output power and the current value of the at least one second output power is not greater than the current difference predetermined value.

16. The operating method in claim 11, wherein the step (c) further comprises:
   (c4) the first active linear module comprising a first active linear circuit and a first current detecting unit; each of the at least one second active linear module comprising a second active linear circuit and a second current detecting unit; the current signals comprising a first current signal outputted by the first current detecting unit and a second current signal outputted by the second current detecting unit; the first current signal outputted by the first current detecting unit controlling the first active linear circuit to cease performing a linear conversion when the difference value between the current value of the first output power and the current value of the at least one second output power is greater than the current difference predetermined value, so the output power is used as the first output power, and the second current signal outputted by the second current detecting unit controlling the second active linear circuit to linearly convert the output power into the at least one second output power.

17. The operating method in claim 16, wherein the step (c4) further comprises:
   (c5) the first current detecting unit detecting a voltage difference of an output path of the power conversion module, and outputting the first current signal based on the voltage difference to control the first active linear circuit to cease performing the linear conversion, and the control module controlling the feedback control module to increase a voltage value of the output power based on the first current signal.

18. The operating method in claim 11, wherein the step (c) further comprises:
   (c6) the first active linear module comprising a first active linear circuit and a first current detecting unit; each of the at least one second active linear module comprising a second active linear circuit and a second current detecting unit; the current signals comprising a first current signal outputted by the first current detecting unit and a second current signal outputted by the second current detecting unit; the control module determining whether the difference value between the current value of the first output power and the current value of the at least one second output power is greater than the current difference predetermined value; the control module outputting a disabling signal to control the first active linear circuit to cease performing a linear conversion when the control module is configured to determine that the difference value between the current value of the first output power and the current value of the at least one second output power is greater than the current difference predetermined value, so that the output power is used as the first output power, and the control module outputting an enabling signal to control the second active linear circuit to linearly convert the output power into the at least one second output power.

19. The operating method in claim 18, wherein the step (c6) further comprises:
   (c7) the first current detecting unit detecting a voltage difference of an output path of the power conversion module, and the first current detecting unit outputting the first current signal to the control module based on the voltage difference; the control module controlling the feedback control module to increase a voltage value of the output power based on the first current signal, and the control module outputting the disabling signal to control the first active linear circuit to cease performing the linear conversion based on the first current signal.

* * * * *